United States Patent [19]

Theobald

[11] Patent Number: 5,656,917
[45] Date of Patent: Aug. 12, 1997

[54] BATTERY IDENTIFICATION APPARATUS AND ASSOCIATED METHOD

[75] Inventor: David James Theobald, Woodstock, Ill.

[73] Assignee: Motorola, Inc., Schaumburg, Ill.

[21] Appl. No.: 572,837

[22] Filed: Dec. 14, 1995

[51] Int. Cl.⁶ .......................... H01M 10/44; H01M 10/46
[52] U.S. Cl. .................... 320/22; 320/2; 320/15; 320/35
[58] Field of Search .................. 320/2, 15, 22, 320/23, 35

[56] References Cited

U.S. PATENT DOCUMENTS

| | | |
|---|---|---|
| 4,684,870 | 8/1987 | George et al. . |
| 4,730,287 | 3/1988 | Yoshino et al. . |
| 4,742,441 | 5/1988 | Akerson . |
| 4,852,147 | 7/1989 | Suzuki et al. . |
| 5,028,859 | 7/1991 | Johnson et al. . |
| 5,130,883 | 7/1992 | Edwards . |
| 5,164,652 | 11/1992 | Johnson et al. ............ 320/2 |
| 5,184,059 | 2/1993 | Patino et al. ............ 320/15 |
| 5,212,836 | 5/1993 | Matsushita . |
| 5,216,302 | 6/1993 | Tanizawa . |
| 5,237,257 | 8/1993 | Johnson et al. ............ 320/2 |
| 5,254,931 | 10/1993 | Martensson ............ 320/22 |
| 5,332,957 | 7/1994 | Lee ............ 320/2 |
| 5,363,031 | 11/1994 | Miller et al. . |
| 5,460,901 | 10/1995 | Syrjälä ............ 429/90 |
| 5,489,834 | 2/1996 | Pitkanen ............ 320/15 |
| 5,546,317 | 8/1996 | Andrieu ............ 364/481 |

FOREIGN PATENT DOCUMENTS

| | | |
|---|---|---|
| 0 340 794 | 5/1989 | European Pat. Off. . |
| 2239567 | 7/1991 | United Kingdom . |
| 2242794 | 9/1991 | United Kingdom . |

OTHER PUBLICATIONS

U.S. Pat. Appln No. 08/120,509—Alberth, Jr., et al; filed 13 Sep. 93.

*Primary Examiner*—Peter S. Wong
*Assistant Examiner*—Patrick B. Law
*Attorney, Agent, or Firm*—Randall S. Vaas; Mark D. Patrick

[57] ABSTRACT

A battery identification system (100) includes a battery (104), a device (102), and an apparatus (106). The battery (104) is of a particular type (e.g., NiCd, NiMH, Lithium Ion) and is detachably coupled to the device (102). The device (102) includes a controller (112) that determines the type of the battery (104) and generates a number of signals according to the type. The apparatus (106) is detachably coupled to the device (102) and includes a current source (164) and a controller (162) that detects the number of signals. The controller (162), responsive to the controller (112), controls the current source (164) to initially provide charging current at a first rate to the battery (104) until reception of a first one of the number of signals. The controller (162) thereafter identifies the type of the battery (104) from the detection of additional ones of the number of signals.

19 Claims, 4 Drawing Sheets

BATTERY IDENTIFICATION APPARATUS AND ASSOCIATED METHOD

FIELD OF THE INVENTION

This invention relates generally to battery-powered electronic devices and, more specifically, to an apparatus and a method for identifying the type of battery attached to the electronic device.

BACKGROUND OF THE INVENTION

Many portable electronic devices are powered by a rechargeable battery. A rechargeable battery consists of one or more rechargeable electrochemical cells. The type of chemical comprising the cells—for example, Nickel Cadmium (NiCd), Nickel Metal Hydride (NiMH), and Lithium Ion establishes the battery type.

Although different battery types exhibit different electrical characteristics, they are often used interchangeably to power portable electronic devices. This can create difficulties because different types require different charging schemes. For example, NiCd and NiMH batteries are most effectively charged by a charging current that is applied at a fast rate. A lithium battery can be charged at a fast rate, but this must be done according to a specific profile of current and voltage. These profiles require variations in charging current between the fast slow rates and, thereby, add to the overall complexity of the charging scheme. Accordingly, to provide the appropriate charging current, a charger must know the type of the battery to be charged.

To accommodate these different battery types, existing chargers identify the battery type in various ways. One way is to equip different battery types with resistors having different resistance values. The charger senses the voltage across the resistor of the battery and determines the battery type by comparing the sensed voltage to voltages and associated battery types contained in a look-up table read from the charger's memory.

The battery type is determined upon direct attachment of the battery to the charger. However, if the battery does not fit in the charger, the charger cannot charge the battery. This dependency on the intermating ability of the battery and charger is eliminated by providing a charger that connects directly to the portable electronic device to charge a battery attached to the device. However, with this connection, the existing charger cannot read the battery type from the battery.

What is needed is an improved apparatus and method for battery type identification.

DETAILED DESCRIPTION OF THE PREFERRED EMBODIMENTS

A system includes a battery, an electronic device, and an apparatus. The battery is of a particular type and includes one or more electrochemical cells. The battery is detachably coupled to the electronic device. The electronic device includes a device controller that detects a temperature signal of the battery, determines the type of the battery from the temperature signal, and generates a number of predetermined signals according to the battery type. The apparatus is detachably coupled to the electronic device. The apparatus includes an apparatus controller that detects the number of predetermined signals. The apparatus includes a current source coupled to both the apparatus controller and the battery. The apparatus controller controls the current source to provide a fast charging current to the battery until it receives a first one of the number of predetermined signals. The apparatus controller thereafter identifies the type of the battery from additional ones of the number of predetermined signals received. Charging current is controlled accordingly.

Figure 1:
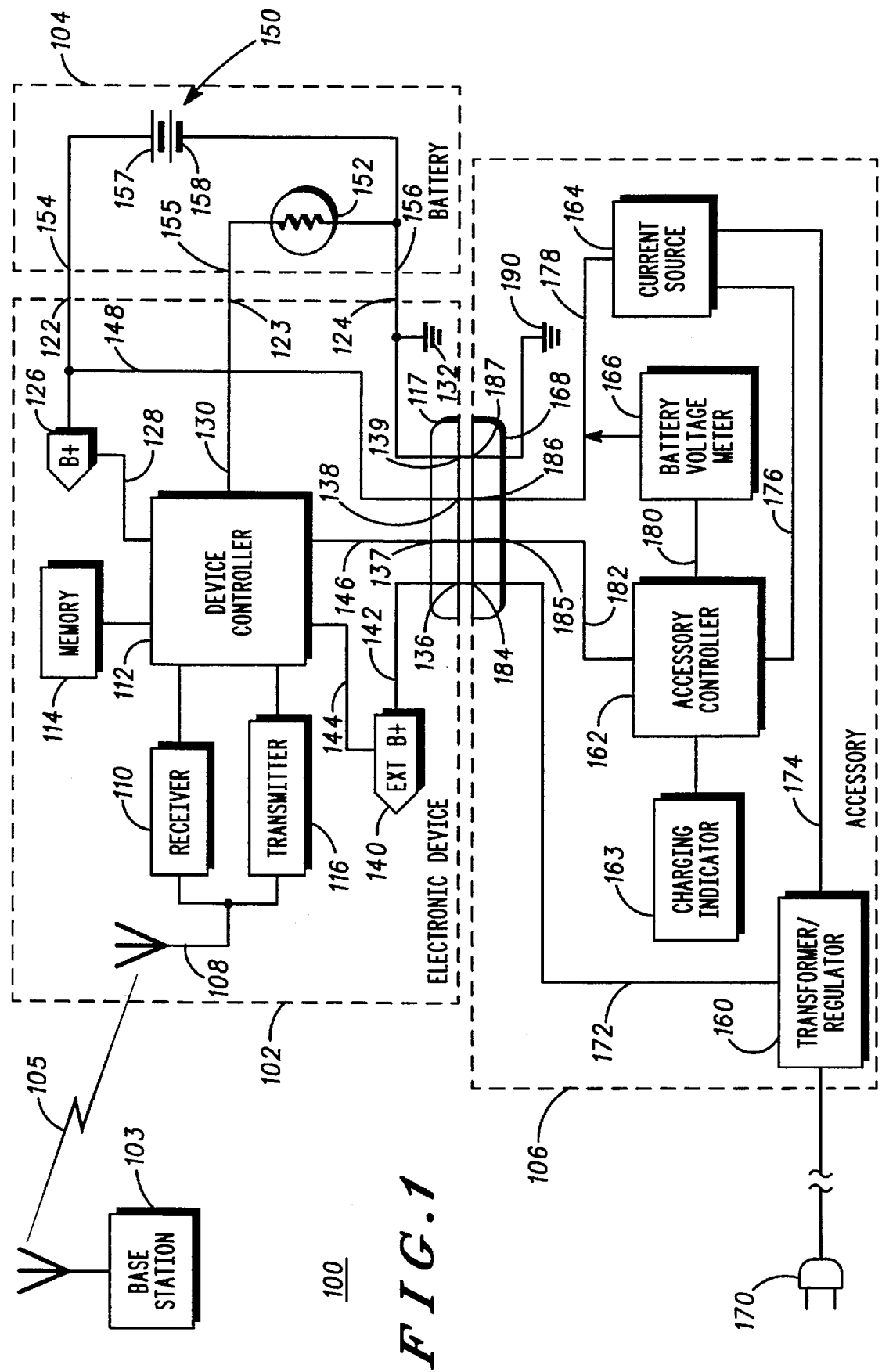
FIG. 1 illustrates, in block diagram form, a battery identification system containing an electronic device, a battery, and an apparatus.

FIG. 1 illustrates battery identification system 100. Battery identification system 100 includes electronic device 102, battery 104, and apparatus 106. Electronic device 102 is illustrated as a cellular radiotelephone operating in a cellular radiotelephone system. The cellular radiotelephone system includes base station 103. Base station 103 provides cellular radiotelephone service to cellular radiotelephones, such as electronic device 102, contained within a particular geographic area. Base station 103 communicates with these cellular radiotelephones via radio frequency (RF) signals, such as RF signals 105 communicated between base station 103 and electronic device 102.

Electronic device 102 includes antenna 108, receiver 110, device controller 112, memory 114, transmitter 116, and device connector 117. Device controller 112 is implemented using any suitable microprocessor, such as a 68HC11 microprocessor commercially available from Motorola, Inc. Device controller 112 controls the operation of electronic device 102 according to an algorithm read from memory 114. Antenna 108 detects and emits RF signals 105. Receiver 110 and transmitter 116 operate under control of device controller 112 to convert signals received by antenna 108 into receive data signals input to device controller 112 and to convert data signals generated by device controller 112 into signals to be transmitted by antenna 108, respectively. Device controller 112 also generates signals for communicating with accessories, such as apparatus 106, that are electrically connected to electronic device via device connector 117.

Electronic device 102 includes battery ports 122–124 for electrically coupling to battery 104 when it is detachably connected to electronic device 102. Battery port 122 is coupled to battery supply terminal (B+) 126 of electronic device 102. Battery supply terminal 126 provides power to receiver 110, device controller 112, and transmitter 116 via electrical connections (not shown) when battery 104 is attached. Battery supply terminal 126 is monitored by device controller 112 via monitoring line 128. Battery port 123 is coupled to device controller 112 via battery data line 130. Battery data line 130 provides battery identity information and temperature information to device controller 112 when battery 104 is attached. Battery port 124 is coupled to electrical ground 132 of electronic device 102.

Device connector 117 of electronic device 102 includes input/output (I/O) ports 136–139. I/O port 136 is coupled to external supply terminal (EXT B+) 140 via device external supply line 142. External supply terminal 140 provides power to receiver 110, device controller 112, and transmitter 116 via electrical connections (not shown) when apparatus 106 is attached to electronic device 102. A switch (not shown), connected between battery 104 and external supply terminals 126, 140, prevents battery supply terminal 126 from providing power when apparatus 106 is attached. External supply terminal 140 is monitored by device controller 112 via monitoring line 144. I/O port 137 is coupled to device controller 112 via device signalling line 146. Device controller 112 communicates battery information to apparatus 106 via device signalling line 146. I/O port 138 is coupled to battery port 122 via device charging line 148. Device charging line 148 delivers charging current to battery 104 when apparatus 106 is attached. I/O port 139 is coupled to battery port 124 and electrical ground 132.

Although electronic device 102 is illustrated as a cellular radiotelephone, the present invention will also find application in radios, portable computers, cordless telephones, two-way radios, pagers, personal digital assistants, tape recorders, and the like, and "device" as used herein shall refer to all such battery powered electronic devices and their equivalents.

Battery 104 includes one or more electrochemical cells 150, thermistor 152, and contacts 154–156. Electrochemical cell 150 includes positive polarity terminal 157 and negative polarity terminal 158. Positive polarity terminal 157 is coupled to contact 154. Negative polarity terminal 158 is coupled to contact 156. Electrochemical cell 150 is preferably rechargeable, and can be, for example, any one of the following chemical types: Nickel-Cadmium (NiCd), Nickel-Metal Hydride (NiMH), Alkaline, or Lithium Ion. Thermistor 152 is coupled between negative polarity terminal 158 and contact 155. A voltage level across thermistor 152 forms a temperature signal corresponding to the temperature of electrochemical cell 150. Battery 104 can contain circuitry (not shown) coupled to contact 154 that monitors incoming current and the voltage of electrochemical cell 150. This circuitry can alter the voltage level across thermistor 152 if conditions so require.

Battery 104 is detachably coupled to electronic device 102 such that contacts 154–156 of battery 104 mate with, and electrically connect to, battery ports 122–124 of electronic device 102, respectively. Battery 104 provides a battery voltage to battery supply terminal 126 to power electronic device 102. Battery 104 powers electronic device 102 until it discharges to a voltage level that is insufficient to operate electronic device 102.

Apparatus 106, which is illustrated as a battery charger, includes transformer/regulator 160, apparatus controller 162, current source 164, battery voltage meter 166, and apparatus connector 168. Transformer/regulator 160 is connected to wall plug 170. Wall plug 170 is connected to a conventional wall outlet (not shown) of a main power supply (e.g., 110 V AC power supply in the U.S.) to provide power to apparatus 106. Those skilled in the art will recognize that transformer/regulator 160 includes conventional circuitry to transform AC power from wall plug 170 into DC power. Additional conventional circuitry regulates and adjusts the DC power to a particular voltage level. Transformer/regulator 160 outputs DC power, such as 9.5 V, to apparatus connector 168 via apparatus external supply line 172. Transformer/regulator 160 outputs DC power to current source 164 via current source supply line 174. It will be recognized that transformer/regulator 160 also provides regulated power necessary to operate the components of apparatus 106, such as apparatus controller 162, via electrical connections (not shown).

Current source 164 is coupled to transformer/regulator 160 via current source supply line 174, apparatus controller 162 via charging control line 176, and apparatus connector 168 via apparatus charging line 178. Current source 164 is fed by DC power from transformer/regulator 160 input via current source supply line 174. Current source 164 includes known circuitry, such as a pulse width modulator (PWM), that generates charging current from the DC power supplied by transformer/regulator 160. It will be recognized that current source 164 generates charging current at different predetermined rates—a fast rate, a trickle charge rate, and a zero rate (no charging)—based on a control signal input to current source 164 by apparatus controller 162 via charging control line 176. The control signal preferably comprises multiplexed logic states that are demultiplexed by current source 164. Current source 164 outputs charging current on apparatus charging line 178.

Battery voltage meter 166 is coupled to apparatus charging line 178 and apparatus controller 162 via meter line 180. Battery voltage meter 166 includes known comparator circuitry for comparing a voltage level on apparatus charging line 178 with a predetermined voltage reference. The voltage level corresponds to the actual voltage level of battery 104 when apparatus 106 is attached to electronic device 102. The predetermined voltage reference corresponds to the voltage level of battery 104 when fully charged, such as 8.4 V. Battery voltage meter 166 outputs a signal, such as a high signal, on meter line 180 when the voltage level of battery 104 is below the predetermined voltage reference. Battery voltage meter 166 outputs a signal, such as a low signal, on meter line 180 when the voltage level of battery 104 is equal to or above the predetermined voltage reference.

Apparatus controller 162 is coupled to apparatus connector 168 via apparatus signalling line 182, battery voltage meter 166 via meter line 180, and current source 164 via charging control line 176. Apparatus controller 162 may be implemented using any suitable commercially available microprocessor, such as a 68HC11 microprocessor sold by Motorola, Inc. Apparatus controller 162 controls the operation of apparatus 106 according to a predetermined algorithm stored within apparatus controller 162. Apparatus controller 162 controls the charging current output by apparatus 106 via charging control line 176 responsive to signals input via apparatus signalling line 182 and meter line 180. Algorithms for controlling the charging current level are well known, and will not be described in greater detail herein for brevity.

Charging indicator 163 is coupled to apparatus controller 162 to provide a visual indication of the charging status of battery 104. Apparatus controller 162 controls charging indicator 163 to indicate to the user when apparatus 106 is charging battery 104 and when apparatus 106 has completed charging battery 104. Charging indicator 163 indicates charging when a signal, such as a high signal, is input thereto. Charging indicator 163 indicates charging is complete when a signal, such as a low signal, is input thereto. Charging indicator 163 is preferably a bi-colored light-emitting diode (LED) that illuminates red upon reception of the high signal and illuminates green upon reception of the low signal.

Apparatus connector 168 includes I/O ports 184–187. I/O port 184 is connected to transformer/regulator 160 via apparatus external supply line 172. I/O port 185 is coupled to apparatus controller 162 via apparatus signalling line 182. I/O port 186 is coupled to current source 164 via apparatus charging line 178. I/O port 187 is coupled to electrical ground 190 of apparatus 106.

Apparatus 106 is detachably coupled to electronic device 102 such that apparatus connector 168 mates with device connector 117 and I/O ports 184–187 of apparatus connector 168 electrically connect I/O ports 136–139 of electronic device 102, respectively. Once attached, electronic device 102 is powered by an external supply voltage provided by transformer/regulator 160 via the path of apparatus external supply line 172—I/O port 184—I/O port 136—device external supply line 142—external supply terminal 140. Electronic device 102 operates via the external supply voltage while battery 104 is being recharged.

Figure 2:
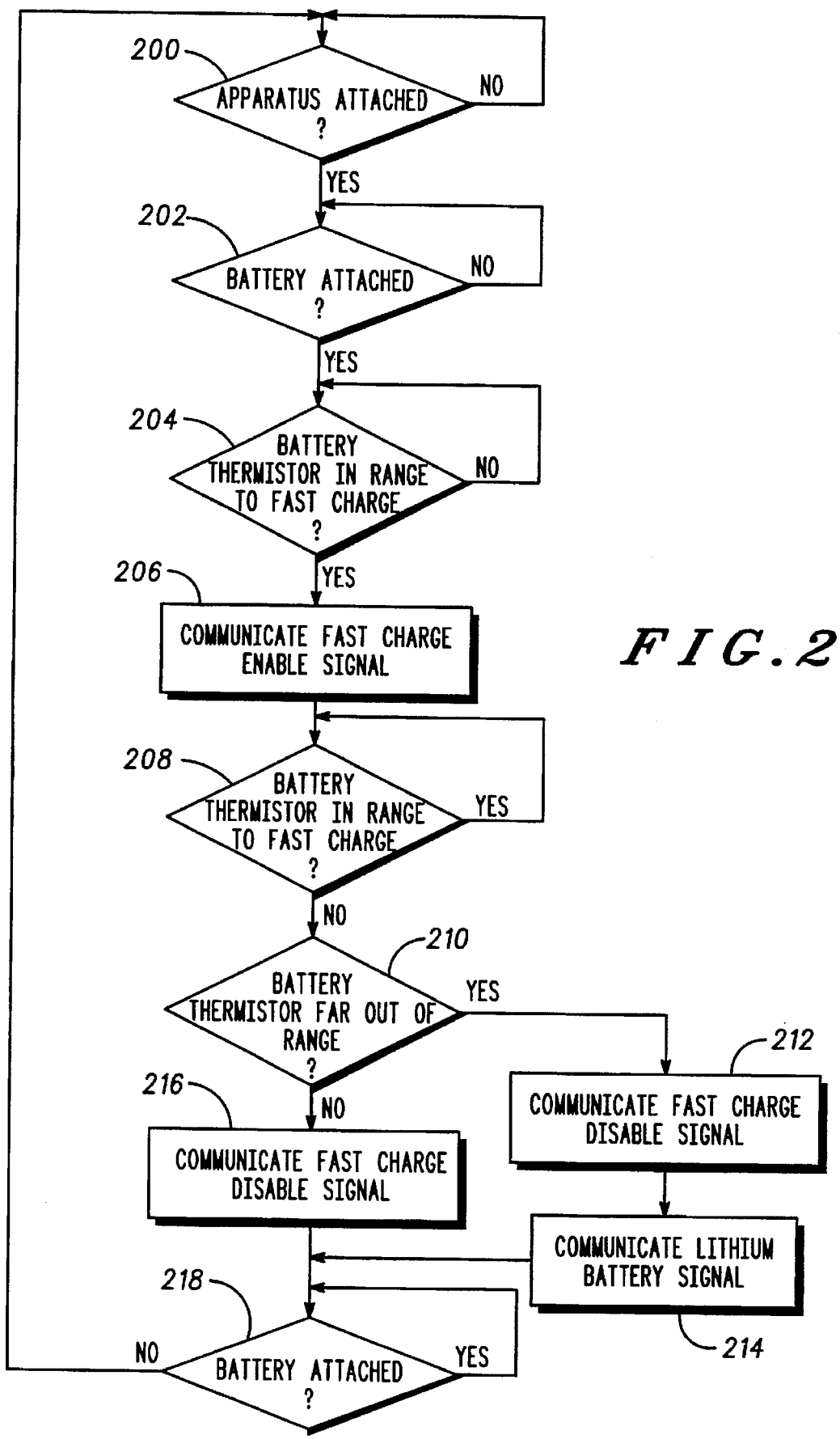
FIG. 2 illustrates, in flow chart form, a method of communicating a type of the battery, the method implemented by the electronic device of FIG. 1.
Figure 3:
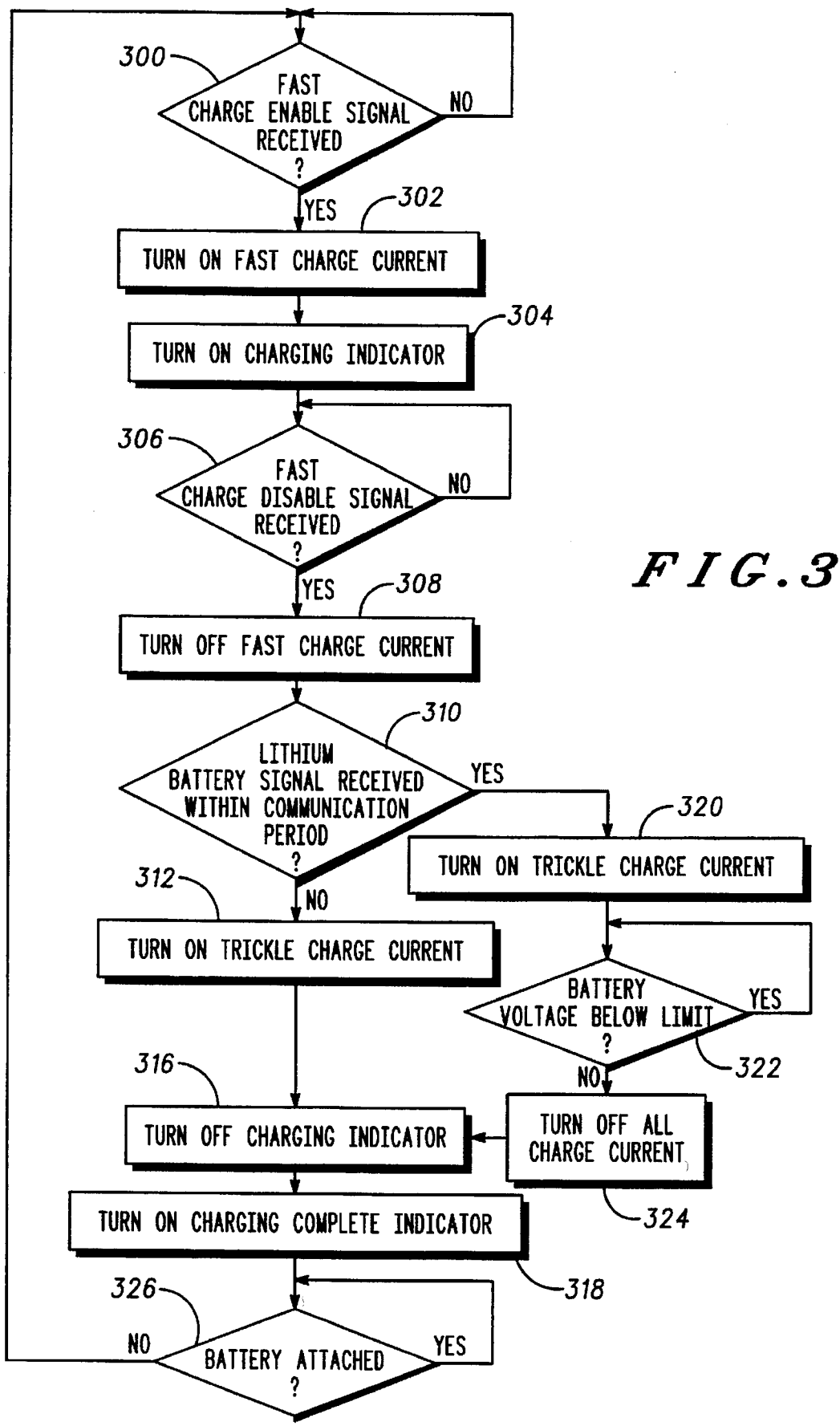
FIG. 3 illustrates, in flow chart form, a method of identifying the type of the battery, the method implemented by the apparatus of FIG. 1.

Battery identification system 100 operates according to processes shown in FIGS. 2 and 3. Electronic device 102 communicates the identity of battery 104 according to the process shown in FIG. 2. The process of FIG. 2 is implemented by device controller 112. Apparatus 106 identifies battery 104 according to the process shown in FIG. 3. The process of FIG. 3 is implemented by apparatus controller 162.

Referring to FIGS. 1 and 2, device controller 112 waits, at decision block 200, until apparatus 106 is attached to electronic device 102. Device controller 112 senses attachment of apparatus 106 from the presence of the external supply voltage (provided by transformer/regulator 160 of apparatus 106) on monitoring line 144. Once apparatus 106 is attached, device controller 112 determines if battery 104 is attached to electronic device 102 at decision block 202. Device controller 112 determines attachment of battery 104 from the presence of the battery level voltage on monitoring line 128. The process remains at decision block 202 until battery 104 is attached.

Once battery 104 is attached, device controller 112 determines if the temperature signal of battery 104 on battery data line 130 is within a range of voltages that correspond to a predetermined temperature range at decision block 204. Device controller 112 determines if the temperature signal is within the predetermined temperature range by comparing the temperature signal to a predetermined voltage range stored in memory 114 that correspond to the predetermined temperature range, such as between 5° C. (5 degrees Celsius) and 45° C. (45 degrees Celsius). The process remains at decision block 204 until the temperature signal is within the temperature range.

Once the temperature signal is within the temperature range, device controller 112 communicates a fast charge enable signal to initiate fast charging of battery 104 by apparatus 106 at block 206. Device controller 112 generates the fast charge enable signal on device signalling line 146, which is communicated to apparatus controller 162 via I/O ports 137, 185 and apparatus signalling line 182. The fast charge enable signal is preferably a high signal.

The process then proceeds to decision block 208 where device controller 112 determines, during fast charging, if the temperature signal is still within the predetermined temperature range. Device controller 112 monitors the temperature signal on battery data line 130 during the fast charging of battery 104. Until the temperature signal corresponds to a temperature that falls outside of the predetermined temperature range, the process remains at decision block 208.

Once the temperature signal indicates a temperature outside of the predetermined temperature range, the process proceeds to decision block 210 where device controller 112 determines the identity of battery 104. Battery identification is necessary because, as previously stated, different battery types require different charging schemes. For example, lithium batteries cannot be charged with the same scheme as NiCd and NiMH batteries. Therefore, in order to be compatible with batteries like lithium batteries, apparatus 106 must know the identity of battery 104.

Device controller 112 identifies battery 104 based on its fast charging compatibility. Device controller 112 determines fast charging compatibility by scrutinizing the temperature signal provided by thermistor 152 after the temperature signal has fallen outside of the temperature range. If battery 104 is a lithium battery, thermistor 152 could be shorted to electrical ground 132 when battery 104 is subjected to an incompatible fast charging scheme (e.g., a scheme that is meant to be compatible with NiCd or NiMH batteries). This causes the temperature signal to fall well outside the predetermined temperature range. Therefore, when the temperature signal corresponds to a temperature that is too far above the predetermined temperature range, such as 70° C., device controller 112 identifies battery 104 as a battery that is not compatible with this fast charging scheme (i.e., a lithium battery). If the temperature signal is not well outside of the range, device controller 112 identifies battery 104 as a NiCd or a NiMH battery.

Although device controller 112, as described, determines the identity of battery 104 based on the comparison of the temperature of electrochemical cell 150 to predetermined temperature ranges, it will be recognized that battery identification can alternatively be accomplished in accordance with other detection means, such as the apparatus disclosed in U.S. Pat. No. 5,237,257 entitled "Method and Apparatus For Determining Battery Type And Modifying Operating Characteristics", issued on Aug. 17, 1993 to Johnson et al. Battery 104 can be equipped with a resistor or other electrical component having a value corresponding to the battery type. Device controller 112 could then determine the identity of battery 104 by comparing the voltage across the resistor to voltages and associated battery types stored in memory 114.

If the temperature signal indicates that battery 104 is a lithium battery, the process proceeds, first, to block 212 and, next, to block 214. At block 212, device controller 112 generates a fast charge disable signal on device signalling line 146 to stop fast charging. The fast charge disable signal is preferably a low signal.

At block 214, device controller 112 communicates that battery 104 is a lithium battery via a lithium battery signal. Device controller 112 communicates the lithium battery signal during a communication period following the generation of the fast charge disable signal. The lithium battery signal comprises a predetermined number of signals generated by device controller 112 on device signalling line 146 during the communication period. The lithium battery signal preferably comprises five signals, each signal being a pulse with a duration of 64 ms. The pulses comprising the lithium battery signal are generated in a train, each having a cycle that is preferably 128 ms (each 64 ms pulse is separated by 64 ms). The communication period is defined by the largest number of pulses to be generated and, thus, is preferably 640 ms—the amount of time necessary to communicate the five pulses. Device controller 112 provides for the identification of other battery types by generating one, two, or three pulses during the communication period. Thus, different numbers of pulses identify different battery types.

If device controller 112 determines that battery 104 is not a lithium battery, the process proceeds to block 216 where device controller 112 communicates the fast charge disable signal. Device controller 112 communicates that battery 104 is a NiCd or NiMH battery by generating no signals during the communication period.

After blocks 214 and 216, the process proceeds to decision block 218 where device controller 112 determines if battery 104 is still attached. The process remains at decision block 218 until battery 104 is detached. Upon detachment, the process returns to decision block 200.

Referring to FIGS. 1 and 3, the apparatus controller 162 waits, at decision block 300, until the fast charge enable signal is received from electronic device 102. Once received, apparatus controller 162 proceeds to block 302 and controls current source 164 to generate charging current at a fast rate. Charging current is provided to the positive polarity terminal 157 of battery 104 via the path of apparatus charging line 178—I/O port 186—I/O port 138—device charging line 148—battery port 122—battery contact 154. Additionally, apparatus controller 162 controls charging indicator 163 to indicate to the user that apparatus 106 is fast charging battery 104 at block 304.

Apparatus 106 fast charges battery 104 until device controller 112 signals apparatus 106 to stop fast charging at decision block 306. Upon reception of the fast charge disable signal, apparatus controller 162 controls current source 164 to stop fast charging at block 308.

Following reception of the fast charge disable signal to stop fast charging, apparatus controller 162 waits the duration of the communication period, which is preferably 640 ms, at decision block 310. If no signals are received during the communication period, apparatus controller 162 identifies battery 104 as a NiCd or NiMH battery and controls current source 164 to begin trickle charging at block 312. NiCd or NiMH batteries are ready to use once fast charging is completed. As such, apparatus controller 162 controls charging indicator 163 to indicate to the user that charging is complete and battery 104 is full and ready to use at blocks 316, 318.

If the lithium battery signal sent by the device controller 112 is received during the communication period, apparatus controller 162 identifies battery 104 as a lithium battery and controls current source 164 to begin trickle charging at block 320. Without trickle charging, battery 104, as a lithium battery, may not be ready to use. Therefore, apparatus controller 162 continues to indicate that apparatus 106 is charging via charging indicator 163 while the trickle charge is supplied to battery 104. Known chargers, only compatible with NiCd or NiMH batteries, would falsely indicate that battery 104, a lithium battery, is recharged and ready for use once trickle charging is commenced. Apparatus 106 continues to trickle charge battery 104 until battery voltage meter 166 indicates to apparatus controller 162 that battery 104 is fully charged at decision block 322. Once fully charged, apparatus controller 162 generates a predetermined signal on charging control line 176. Responsive thereto, current source 164 stops all charging at block 324. Apparatus controller 162 controls charging indicator 163 to indicate that charging is complete and battery 104 is full and ready to use at blocks 316 and 318.

Following block 318, apparatus 106 will not allow fast charging to start again at decision block 300 until battery 104 has been removed at decision block 326. Detachment of battery 104 is sensed by battery voltage meter 166 and conveyed to apparatus controller 162 via meter line 180.

Although apparatus 106 is illustrated as a battery charger, it will be recognized that other accessories, such as modems, scrambler units, and the like, that are powered by battery 104 when attached to electronic device 102, can adjust their operating parameters in accordance with specific electrical characteristics of battery 104 if the identity of battery 104 is known to them. As such, the present invention will find application in these accessories and "apparatus" as used herein shall refer to each of these and their equivalents.

Figure 4:
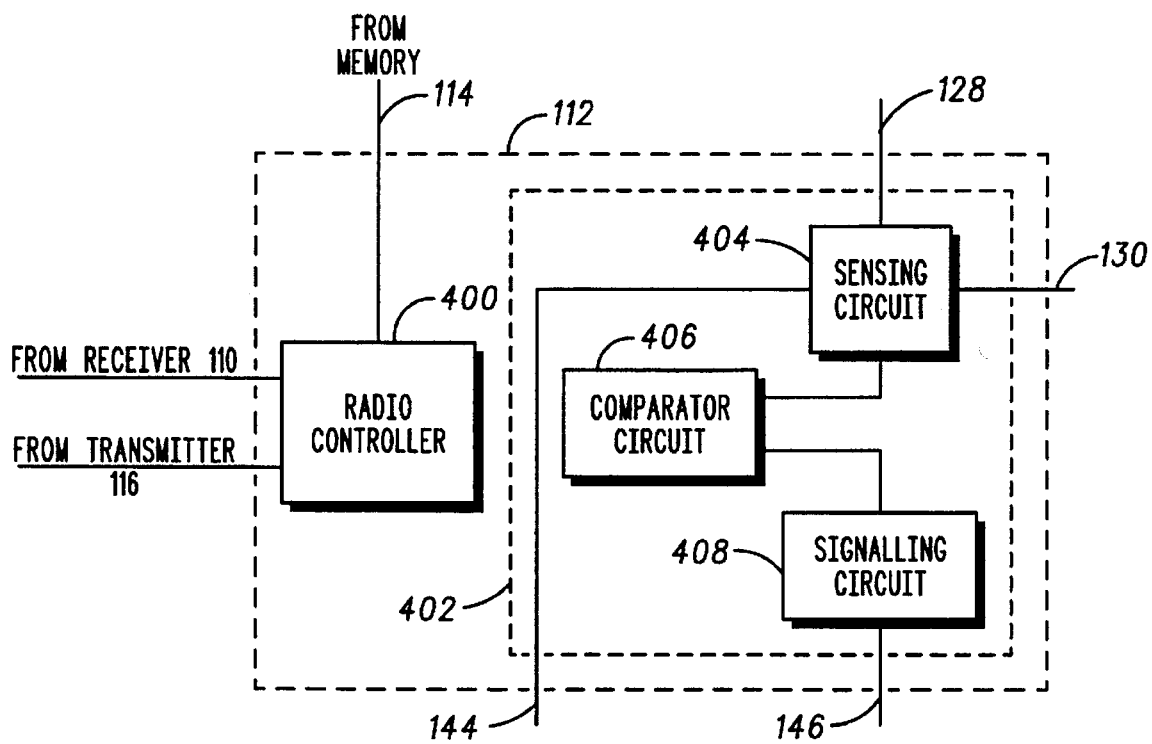
FIG. 4 illustrates, in block diagram form, an alternative implementation of a controller of the electronic device of FIG. 1.

The portion of device controller 112 that determines and communicates the identity of battery 104, can alternatively be modeled using known discrete electronic components, as shown in FIG. 4. In FIG. 2, device controller 112 includes radio controller 400 and device communication circuit 402. Radio controller 400 controls receiver 110 and transmitter 116 of FIG. 1 based on an algorithm read from memory 114 of FIG. 1. Device communication circuit 402 includes sensing circuit 404, comparator circuit 406, and signalling circuit 408.

Sensing circuit 404 is coupled to monitoring lines 128, 144 and battery data line 130, and comparator circuit 406. Sensing circuit 404 includes discrete electronic components, such as buffers (not shown), voltage level comparators (not shown), and a sampling switch (not shown). Sensing circuit 404 translates battery and external supply voltages and the voltage of the temperature signal input on monitoring lines 128, 144 and battery data line 130, respectively. Sensing circuit 404 compares the translated battery and external supply voltages to predetermined minimum voltages to determine if battery 104 of FIG. 1 and apparatus 106 of FIG. 1 are attached. If attached, the sampling switch is enabled to sample the buffered temperature signal at time intervals defined by a system clock signal (not shown). The sampled temperature signal is output to comparator circuit 406.

Comparator circuit 406 is coupled to sensing circuit 404 and signalling circuit 408. Comparator circuit 406 includes discrete components, such as multiple stages of voltage level comparators (not shown), and a multiplexer (not shown). Comparator circuit 406 compares the sampled temperature signal received from sensing circuit 404 to predetermined voltages that correspond to a temperature range. If the sampled temperature signal falls outside of the temperature range, comparator circuit 406 generates a first high signal. Otherwise, a first low signal is generated. If the sampled temperature signal is far outside of the temperature range, comparator circuit 406 generates a second high signal. Otherwise, a second low signal is generated. Comparator circuit 406 multiplexes the signals and outputs them to signalling circuit 408.

Signalling circuit 408 is coupled to comparator circuit 406 and device signalling line 146. Signalling circuit 408 includes discrete components, such as a demultiplexer (not shown) and a signal generator (not shown). Signalling circuit 408 demultiplexes the signals received from comparator circuit 406. The first time that the first low signal is received, signalling circuit 408 generates, via the signal generator, the fast charge enable signal on device signalling line 146 (to begin fast charging). Upon reception of the first high signal, signalling circuit 408 generates, via the signal generator, the fast charge disable signal (to stop fast charging) on device signalling line 146. Upon reception of the second high signal, signalling circuit 408 generates, via the signal generator, a train of pulses on device signalling line 146 (to communicate the identity of battery 104 of FIG. 1 as a lithium battery).

Figure 5:
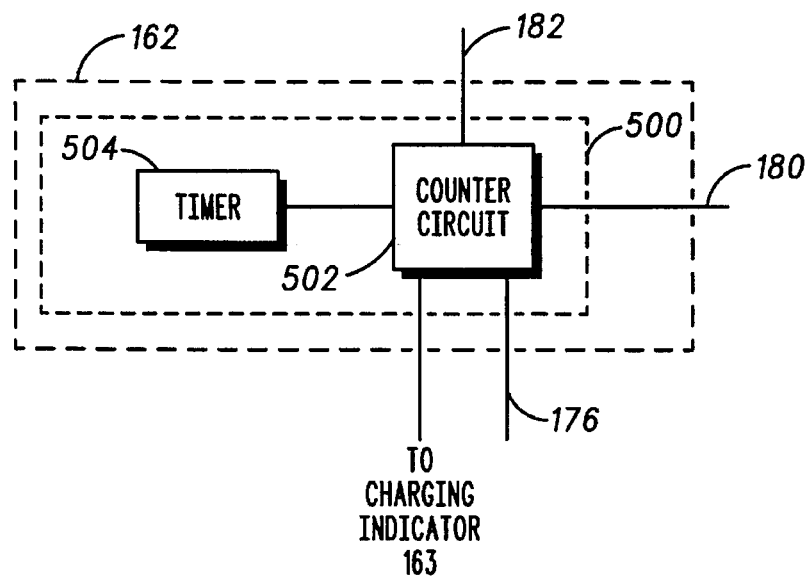
FIG. 5 illustrates, in block diagram form, an alternative implementation of a controller of the apparatus of FIG. 1.

Apparatus controller 162 of FIG. 1 can alternatively be modeled using known discrete electronic components as shown in FIG. 5. In FIG. 5, identification control circuit 500 replaces apparatus controller 162. Identification Control circuit 500 includes counter circuit 502 and timer 504. Counter circuit 502 is coupled to apparatus signalling line 182, meter line 180, charging indicator 163 of FIG. 1, and charging control line 176. Counter circuit includes known discrete electronic components, such as counters (not shown) and logic circuitry (not shown). Upon reception of a high signal, counter circuit 502 initiates fast charging by outputting a first high signal on charging control line 176, and indicates charging to the user by outputting a high signal to charging indicator 163. Upon reception of a low signal, counter circuit 502 stops fast charging by outputting a first low signal on charging control line 176, and starts timer 504 coupled thereto.

Timer 504 runs for a predetermined timing period, which is preferably 640 ms, and enables counter circuit 502 to count or increment during the predetermined timing period. Counter circuit 502 counts pulses received on apparatus signalling line 182 during the predetermined timing period. If counter circuit 502 does not increment a predetermined number of times within the predetermined timing period, battery 104 of FIG. 1 is identified as a NiCd or NiMH battery. Counter circuit 502 starts trickle charging by outputting a second high signal on charging control line 176. Counter circuit 502 outputs a low signal to charging indicator 163 to indicate to the user that charging is complete. If counter circuit 502 does increment the predetermined number of times, preferably five times, within the predetermined timing period, battery 104 is identified as a lithium battery. Once the lithium battery is identified, counter circuit 502 starts trickle charging by outputting the second high signal on charging control line 176 and continues to trickle charge until meter line 180 indicates to counter circuit 502 that battery 104 is fully charged by sending a low signal on meter line 180. Once the lithium battery is fully charged, counter circuit 502 stops all charging by outputting a second low signal on charging control line 176 and indicates to the user that charging is complete by outputting a low signal to charging indicator 163.

Thus it can be seen that a battery identification system is disclosed that includes an electronic device, a rechargeable battery having any one of a number of identities, and an apparatus. The electronic device, which is powered by the battery, communicates the identity of the battery to the apparatus by generating a predetermined number of pulses within a predetermined time period. The apparatus identifies the battery by counting the number of pulses received within the predetermined time period. By knowing the identity of the battery, the apparatus can properly recharge the battery or, if powered by the battery, can operate in accordance with known electrical characteristics of the battery type.

What is claimed is:

1. An apparatus for identifying a type of a battery detachably coupled to an electronic device that is detachably coupled to the apparatus, the apparatus comprising:
   an output;
   an input;
   a charging circuit for supplying a charging current at the output for charging the battery; and
   a control circuit coupled to the input for coupling to the electronic device, the control circuit coupled to the charging circuit, the control circuit including circuitry for interrupting the charging current upon reception of a first predetermined signal from the electronic device, the control circuit including circuitry responsive to a predetermined number of additional first predetermined signals received from the electronic device to identify the type of battery.

2. An apparatus according to claim 1 wherein the circuitry responsive to the predetermined number of additional first predetermined signals includes:
   a counter circuit for counting the additional first predetermined signals.

3. An apparatus according to claim 1 wherein the circuitry responsive to the predetermined number of additional first predetermined signals includes:
   a timer, initiating responsive to reception of the first predetermined signal, for timing a period over which the predetermined number of additional first predetermined signals should be received from the electronic device.

4. An apparatus according to claim 1 wherein each of the additional first predetermined signals includes a pulse having a predetermined duration.

5. An apparatus according to claim 1 wherein
   the apparatus is a battery charger,
   the charging current of the charging circuit is a first charging current or a second charging current,
   the circuitry for interrupting the charging current interrupts the first charging current upon reception of a first predetermined signal from the electronic device, and
   the control circuit further includes circuitry for supplying the second charging current responsive to the circuitry responsive to the predetermined number of additional first predetermined signals.

6. An apparatus according to claim 1 further comprising:
   a battery voltage meter coupled to the output for indicating a voltage of the battery to the control circuit.

7. A device for communicating a type of a battery detachably coupled thereto, the device comprising:
   a connector for communicating signals; and
   a control circuit coupled to the battery and the connector, the control circuit sensing an identification voltage provided by the battery, the identification voltage corresponding to a temperature of the battery, the control circuit comparing the identification voltage to predetermined identification voltages and determining the type of the battery, the predetermined identification voltages corresponding to a predetermined temperature range, the control circuit coupling a predetermined number of first predetermined signals to the connector when the temperature falls outside of the predetermined temperature range, the predetermined number of first predetermined signals indicative of the type of the battery.

8. A device for communicating a type of a battery detachably coupled thereto, the device comprising:
   a connector for communicating signals; and
   a control circuit coupled to the battery and the connector, the control circuit sensing an identification voltage provided by the battery, the control circuit comparing the identification voltage to predetermined identification voltages and determining the type of the battery, the control circuit coupling a predetermined number of first predetermined signals to the connector, the predetermined number of first predetermined signals indicative of the type of the battery, wherein a first one of the predetermined number of first predetermined signals changes charging rate.

9. A device for communicating a type of a battery detachably coupled thereto, the device comprising:
   a connector for communicating signals; and
   a control circuit coupled to the battery and the connector, the control circuit sensing an identification voltage provided by the battery, the control circuit comparing the identification voltage to predetermined identification voltages and determining the type of the battery, the control circuit coupling a predetermined number of first predetermined signals to the connector, additional ones of the predetermined number of first predetermined signals corresponding to the type of the battery, each of the additional ones of the predetermined number of first predetermined signals including a pulse having a predetermined duration.

10. A device for communicating a type of a battery detachably coupled thereto, the device comprising:

a sensing circuit for sensing a temperature of the battery;

a comparator circuit coupled to the sensing circuit for comparing the temperature to a predetermined range of temperatures; and a signalling circuit coupled to the comparator circuit for communicating a predetermined number of first predetermined signals when the temperature falls outside of the predetermined range, the predetermined number of first predetermined signals indicative of the type of the battery.

11. A battery identification system comprising:

a battery having one of a plurality of types;

an electronic device detachably coupled to the battery, the electronic device detecting a type of the battery and generating a predetermined number of first predetermined signals responsive thereto; and an apparatus detachably coupled to the electronic device, the apparatus including circuitry for supplying a charging current to the battery and detecting the predetermined number of first predetermined signals, the apparatus supplying the charging current until reception of a first one of the predetermined number of first predetermined signals, the apparatus thereafter identifying the type of the battery in response to reception of additional ones of the predetermined number of first predetermined signals.

12. A battery identification system according to claim 11 wherein the battery is a lithium battery.

13. A battery identification and charging system:

a battery having an identity;

a radiotelephone detachably receiving the battery, the radiotelephone including radio frequency circuitry to be powered by the battery, a device connector, a device controller coupled to the battery and the device connector, the device controller sensing a temperature of the battery, device controller comparing the temperature to a predetermined range of temperatures, the device controller coupling a predetermined number of signals to the device connector when the temperature falls outside of the predetermined range of temperatures, the device controller initially communicating a first one of the predetermined number of signals to change charging rate, the device controller thereafter communicating additional ones of the predetermined number of signals to indicate the identity of the battery; and a charger including a charger connector detachably coupled to the device connector, the charger connector including an input and an output, a current source for supplying a first charging current or a second charging current at the output of the charger connector for charging the battery, and a charger controller coupled to the input of the charger connector and the current source, the charger controller initially supplying the first charging current until reception of the first one of the predetermined number of signals, the charger controller identifying the battery according to reception of additional ones of the predetermined number of signals within a predetermined time period, the charger controller thereafter supplying the second charging current.

14. A method of identifying a type of a battery detachably coupled to an electronic device, the method comprising the steps of:

supplying a charging current to the battery;

interrupting the charging current after reception of a first predetermined signal; and counting additional receptions of the first predetermined signal to identify the type of the battery.

15. A method according to claim 14 wherein the step of counting is preceded by a step of:

starting a timer.

16. A method according to claim 15 wherein the step of counting is followed by a step of:

stopping the timer a predetermined time period after the step of starting, the predetermined time period being a period over which the additional receptions of the first predetermined signal should occur.

17. A method of charging a battery having a type detachably coupled to an electronic device, the method comprising steps of:

supplying a first charging current to the battery;

interrupting the first charging current after reception of a first predetermined signal;

counting additional receptions of the first predetermined signal to identify the type of the battery; and supplying, responsive to identifying the type of the battery, a second charging current to the battery.

18. A method according to claim 17 wherein the step of supplying is followed by a step of:

interrupting the second charging current when the battery reaches a predetermined voltage.

19. A method of communicating a type of a battery, the method comprising the steps of:

sensing an identification voltage provided by the battery;

comparing the identification voltage to a plurality of predetermined identification voltages and determining the type of the battery; and generating, responsive to determining the type of the battery, a predetermined number of first predetermined signals indicative of the type of the battery, a first one of the predetermined number of first predetermined signals to change charging rate.

* * * * *